(12) United States Patent
Gajek et al.

(10) Patent No.: US 10,936,720 B2
(45) Date of Patent: Mar. 2, 2021

(54) METHOD AND SYSTEM FOR RELIABLE COMPUTATION OF A PROGRAM

(71) Applicant: NEC LABORATORIES EUROPE GMBH, Heidelberg (DE)

(72) Inventors: Sebastian Gajek, Berlin (DE); Francesco Alesiani, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 15/743,286

(22) PCT Filed: Jul. 10, 2015

(86) PCT No.: PCT/EP2015/065823
§ 371 (c)(1),
(2) Date: Jan. 10, 2018

(87) PCT Pub. No.: WO2017/008829
PCT Pub. Date: Jan. 19, 2017

(65) Prior Publication Data
US 2018/0204005 A1    Jul. 19, 2018

(51) Int. Cl.
G06F 21/57    (2013.01)
H04L 9/32    (2006.01)
H04L 9/30    (2006.01)

(52) U.S. Cl.
CPC ............ G06F 21/57 (2013.01); H04L 9/3026 (2013.01); H04L 9/3218 (2013.01); G06F 2221/034 (2013.01)

(58) Field of Classification Search
CPC ................................................ G06F 2221/034
See application file for complete search history.

(56) References Cited

U.S. PATENT DOCUMENTS

2004/0260926 A1* 12/2004 Arditti Modiano ... H04L 9/3255
713/170
2008/0177636 A1* 7/2008 Yoshida ............... G06Q 10/107
705/26.35

(Continued)

OTHER PUBLICATIONS

Parno, Bryan, et al. "Pinocchio: Nearly practical verifiable computation." 2013 IEEE Symposium on Security and Privacy. IEEE, 2013. (Year: 2013).*

(Continued)

*Primary Examiner* — Madhuri R Herzog
(74) *Attorney, Agent, or Firm* — Leydig, Voit & Mayer, Ltd.

(57) ABSTRACT

A method for reliable computation of a program P includes generating, by a verifier, a public verification key vkp and a public evaluation key (ekp), both on a basis of the program P, providing, by the verifier, a number N at random and sending the number N to the at least one provider, producing, by the at least one provider, at least one output Si concatenated with N and producing a signature Σi over a corresponding input into the at least one provider and/or corresponding data within the at least one provider, both the input and/or the data signed under a secret key ski, so that a pair of output and signature (Si, Σi) is transmitted to the computing unit. The verifier verifies the proof πy using the public verification key vkp and rejects y, if the proof verification fails.

17 Claims, 5 Drawing Sheets

(56) References Cited

U.S. PATENT DOCUMENTS

| | | | |
|---|---|---|---|
| 2009/0327141 A1* | 12/2009 | Rabin | G06Q 20/401 705/75 |
| 2012/0089494 A1 | 4/2012 | Danezis et al. | |
| 2012/0297198 A1 | 11/2012 | Danezis et al. | |
| 2017/0126684 A1* | 5/2017 | Armknecht | H04L 63/123 |

OTHER PUBLICATIONS

Costello, Craig, et al. "Geppetto: Versatile verifiable computation." 2015 IEEE Symposium on Security and Privacy. IEEE, 2015. (Year: 2015).*

Shoup, Victor. "Practical threshold signatures." International Conference on the Theory and Applications of Cryptographic Techniques. Springer, Berlin, Heidelberg, 2000. (Year: 2000).*

Zhou J, Cao Z, Dong X, Lin X. EVOC: More efficient verifiable outsourced computation from any one-way trapdoor function. In2015 IEEE International Conference on Communications (ICC) Jun. 8, 2015 (pp. 7444-7449). IEEE. (Year: 2015).*

Blumberg AJ, Thaler J, Vu V, Walfish M. Verifiable computation using multiple provers. IACR Cryptology ePrint Archive. Oct. 2014; 2014:846. (Year: 2014).*

Backes M, Fiore D, Reischuk RM. Verifiable delegation of computation on outsourced data. InProceedings of the 2013 ACM SIGSAC conference on Computer & communications security Nov. 4, 2013 (pp. 863-874). ACM. (Year: 2013).*

Gennaro, Rosario, Craig Gentry, and Bryan Parno. "Non-interactive verifiable computing: Outsourcing computation to untrusted workers." Annual Cryptology Conference. Springer, Berlin, Heidelberg, 2010. (Year: 2010).*

Lai, Junzuo, et al. "Verifiable computation on outsourced encrypted data." European Symposium on Research in Computer Security. Springer, Cham, 2014. (Year: 2014).*

Parno, Bryan, Mariana Raykova, and Vinod Vaikuntanathan. "How to delegate and verify in public: Verifiable computation from attribute-based encryption." Theory of Cryptography Conference. Springer, Berlin, Heidelberg, 2012. (Year: 2012).*

Fiore, Dario, Rosario Gennaro, and Valerio Pastro. "Efficiently verifiable computation on encrypted data." Proceedings of the 2014 ACM SIGSAC Conference on Computer and Communications Security. 2014. (Year: 2014).*

Guo, Linke, et al. "Verifiable privacy-preserving monitoring for cloud-assisted mhealth systems." 2015 IEEE Conference on Computer Communications (INFOCOM). IEEE, 2015. (Year: 2015).*

* cited by examiner

METHOD AND SYSTEM FOR RELIABLE COMPUTATION OF A PROGRAM

CROSS REFERENCE TO RELATED APPLICATIONS

This application is a U.S. National Stage Application under 35 U.S.C. § 371 of International Application No. PCT/EP2015/065823 filed on Jul. 10, 2015. The International Application was published in English on Jan. 19, 2017, as WO 2017/008829 A1 under PCT Article 21(2).

FIELD

The present invention relates to a method for reliable computation of a program P, wherein an output of said program P is computed by a computing unit on the basis of at least one input from at least one provider. Further, the present invention relates to a corresponding system.

BACKGROUND

Reliable computation of a program P becomes more and more important within the field of communication technology and communication between functional entities of various electronic devices.

One example of a technological field requiring reliable and secure computation of a program is the field of autonomous driving. An autonomously driving car, also known as a driverless car, self-driving car and robotic car, is an automated or autonomous vehicle capable of fulfilling the main transportation capabilities of a traditional vehicle. As an autonomous vehicle, it is capable of sensing its environment and navigating with different degree of automation up to the point where not human input is required, as defined in SAE Levels of Driving Automation, see SAE Standard J3016.

While autonomous driving is generally seen as a future emerging technology, many car producers are hampered from proliferating autonomous driving in a large scale. One of the main reasons is autonomous driving modules replace the care and responsibility of a human driver by a computer program. It is generally known that computers are subjected to attacks. The on-board unit of autonomous cars is analogously to a commodity computing system, see FIG. 1 and FIG. 2, running apps on top of an operating system. As any commodity computing environment, it can be 'hijacked', 'hacked' and forced to malfunction or intentionally manipulated after the delivery to the customer.

The consequences can lead to a disaster with tremendous casualties and consequently liability consequences that are one of the main obstacles in European country for the adoption of the technology. In fact, this is a central counter argument against introducing autonomous driving today. For instance, suppose a car communicates a wrong position to a neighboring car because the collision avoidance app has been hacked. Based on the wrong position, the decisions taken by the neighboring car may lead to a car crash. Or, suppose the vehicle must break but the minimum breaking distance has been modified in some way. This will lead to dangerous behavior in unexpected situations, creating high risk of accident and causality. Hence, for the large-scale proliferation of autonomous driving it is of crucial importance to ensure a reliable and trustworthy computation of the car's functions/applications. One of the fundamental safety requirements here is the guarantee of the highest level of reliable computation.

A further field of technology requiring reliable computation of a program P is the field of Machine to Machine, M2M, communication wherein both wireless and wired systems are allowed to communicate with other devices of the same type. M2M is a broad term as it does not comprise specific wireless or wired networking, information and communication technology.

SUMMARY

In an embodiment, the present invention provides a method for reliable computation of a program P, wherein an output of the program P is computed by a computing unit on a basis of at least one input from at least one provider. The method includes generating, by a verifier, a public verification key vkp and a public evaluation key (ekp), both on a basis of the program P, providing, by the verifier, a number N at random and sending the number N to the at least one provider, producing, by the at least one provider, at least one output Si concatenated with N and producing a signature $\Sigma i$ over a corresponding input into the at least one provider and/or corresponding data within the at least one provider, both the input and/or the data signed under a secret key ski, so that a pair of output and signature $(Si, \Sigma i)$ is transmitted to the computing unit. The computing unit computes program P over Si resulting in $y=P(S1, \ldots, Sn)$, provides a cryptographic argument under use of the public evaluation key ekp stating that every input into the at least one provider and/or data within the at least one provider is authenticated by the provider with a valid signature $\Sigma i$ and y is computed by evaluating the program P on the values $S1, \ldots, Sn$, that is $y=P(S1, \ldots, Sn)$, and sends y and provides and sends a proof $\pi y$ of the correctness of y to the verifier. The verifier verifies the proof $\pi y$ using the public verification key vkp and rejects y, if the proof verification fails.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
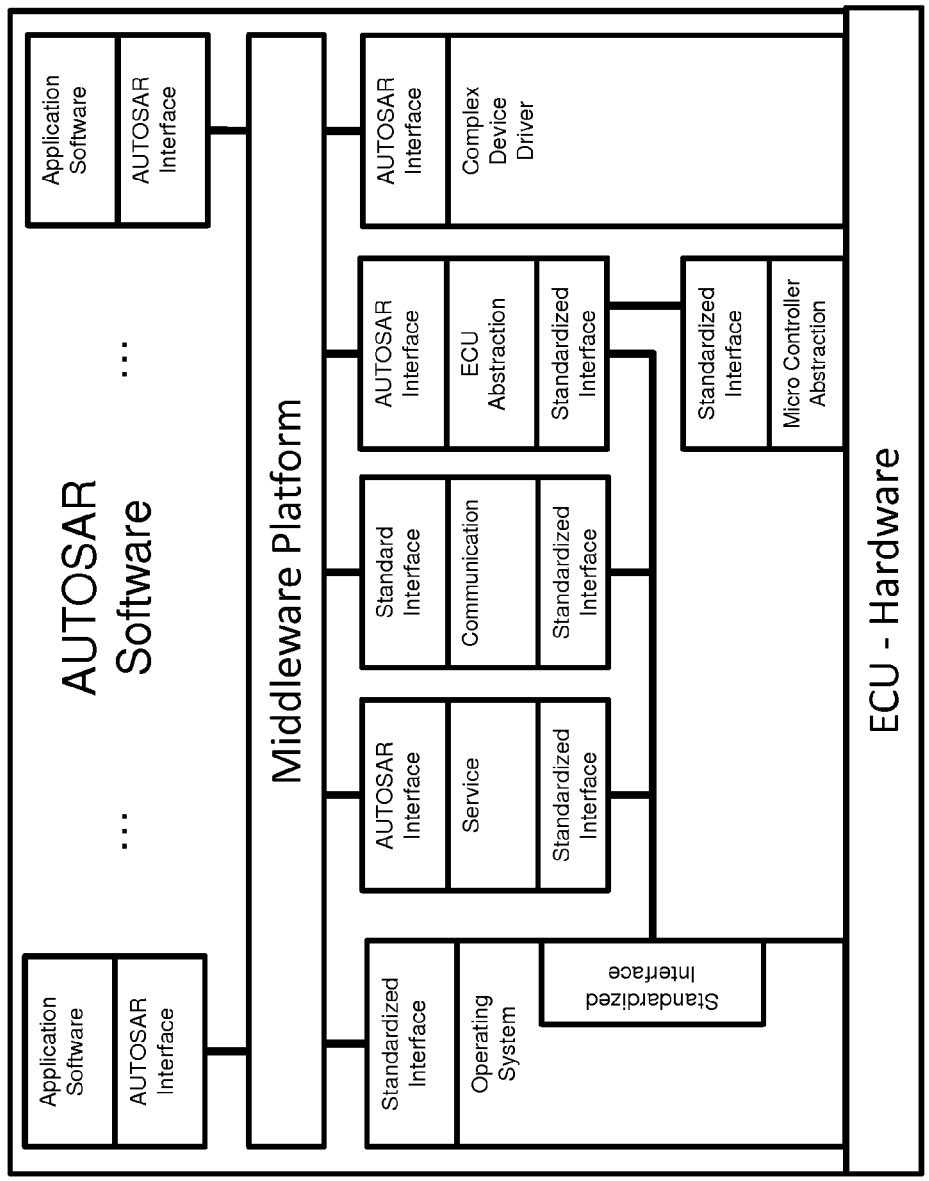
FIG. 1 is showing within a diagram vehicle AUTOSTAR, Automotive Open System.
Figure 2:
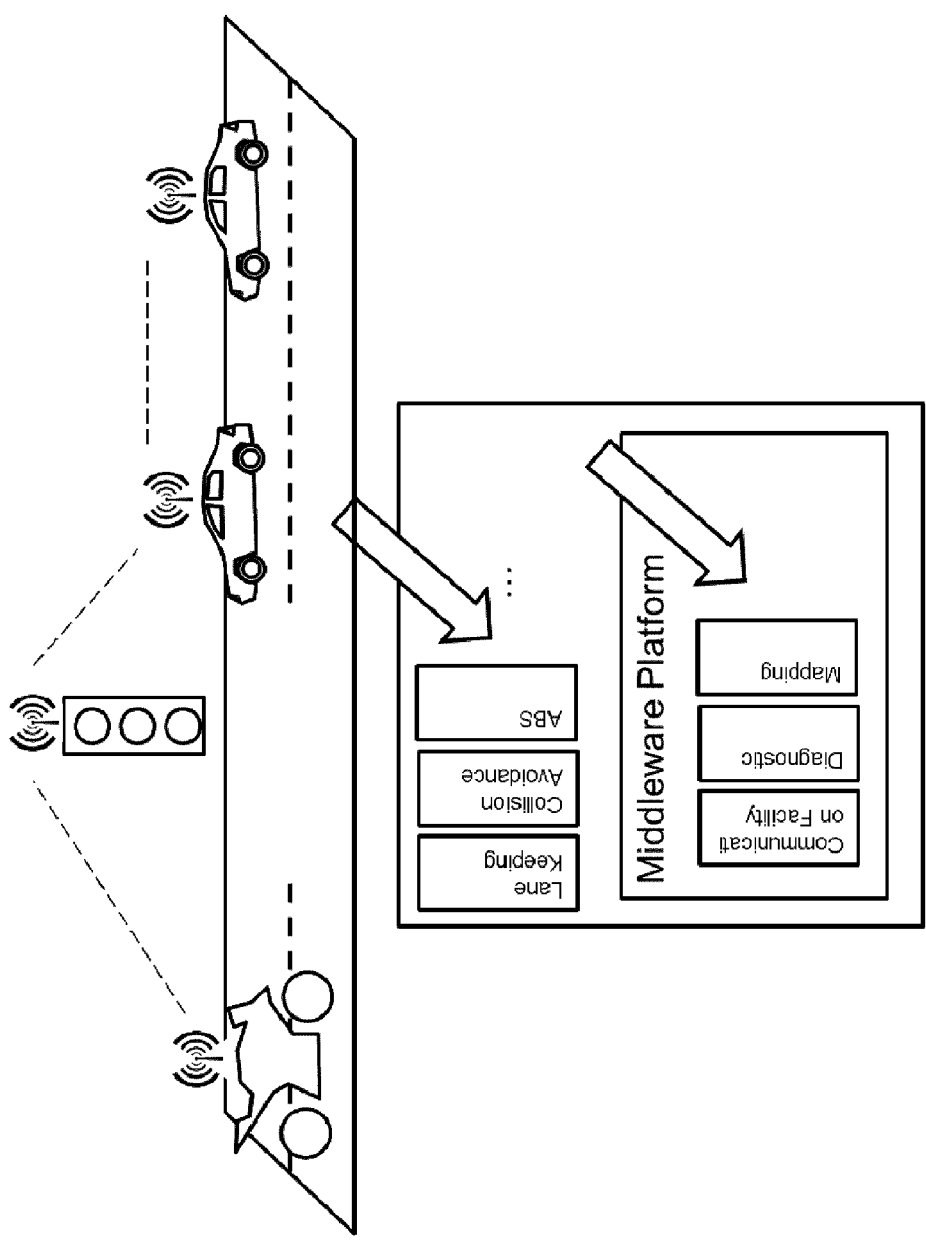
FIG. 2 is showing within a diagram Car2X Communication Model.

Embodiments of the present invention improve and further develop methods and systems for reliable computation of a program P for attesting reliable computation of said program in a simple and secure way.

In accordance with the invention, a method for reliable computation of a program P is provided, wherein an output of said program P is computed by a computing unit on the basis of at least one input from at least one provider, wherein a verifier generates a public verification key $vk_p$ and a public evaluation key $ek_p$, both on the basis of said program P, wherein the verifier provides a number N at random and sends it to the at least one provider, wherein the at least one provider produces at least one output Si concatenated with the number N and produces a signature $\Sigma_i$ over a corresponding input into the at least one provider and/or a corresponding data within the at least one provider, both the input and/or the data signed under a secret key $sk_i$, so that a pair of output and signature $(S_i, \Sigma_i)$ is transmitted to the computing unit, wherein the computing unit computes program P over $S_i$ resulting in $y=P(S_1, \ldots, S_n)$, provides a cryptographic argument under use of the public evaluation key $ek_p$ stating that every input into the at least one provider and/or data within the at least one provider is authenticated by the provider with a valid signature $\Sigma_i$ and y is computed by evaluating the program P on the values $S_1, \ldots, S_n$, that is $y=P(S_1, \ldots, S_n)$, and sends y and provides and sends a proof $\pi_y$ of the correctness of y to the verifier and wherein the verifier verifies the proof $\pi_y$ using the public verification key $vk_p$ and rejects y, if the proof verification fails.

Further, a system is provided in accordance with the invention, comprising a computing unit, at least one provider and a verifier, wherein an output of said program P is computed by the computing unit on the basis of at least one input from the at least one provider, wherein the verifier generates a public verification key $vk_p$ and a public evaluation key $ek_p$, both on the basis of said program P, wherein the verifier provides a number N at random and sends it to the at least one provider, wherein the at least one provider produces at least one output $S_i$ concatenated with the number N and produces a signature $\Sigma_i$ over a corresponding input into the at least one provider and/or a corresponding data within the at least one provider, both the input and/or the data signed under a secret key ski, so that a pair of output and signature $(S_i, \Sigma_i)$ is transmitted to the computing unit, wherein the computing unit computes program P over $S_i$ resulting in $y=P(S_1, \ldots, S_n)$, provides a cryptographic argument under use of the public evaluation key $ek_p$ stating that every input into the at least one provider and/or data within the at least one provider is authenticated by the provider with a valid signature $\Sigma_i$ and y is computed by evaluating the program P on the values $S_1, \ldots, S_n$, that is $y=P(S_1, \ldots, S_n)$, and sends y and provides and sends a proof $\pi_y$ of the correctness of y to the verifier and wherein the verifier verifies the proof $\pi_y$ using the public verification key $vk_p$ and rejects y, if the proof verification fails.

According to embodiments of the invention, it is possible to provide a reliable computation of a program on the basis of suitably applied cryptography. A computing unit can be unsecure or corrupt. However, at least one provider is assumed to be reliable. The result of the computation by the computing unit is provided to the verifier for verifying the reliability of the computation.

In a first step the verifier generates a public verification key and a public evaluation key, both on the basis of said program. Further, the verifier provides a number at random and sends it to the at least one provider. The at least one provider produces at least one output concatenated with the number and produces a signature over a corresponding input into the at least one provider and/or a corresponding data within the at least one provider. The input can be a value of a measurement parameter. The data within the at least one provider can be a data which has been stored within the at least one provider by any prior action. Both, the input and/or the data is signed under a secret key, so that a pair of output and signature can be transmitted to the computing unit by any transmitter or receiver.

The computing unit computes the program over one or more or all outputs from the at least one provider and provides a cryptographic argument under use of the public evaluation key stating that every input into the at least one provider and/or every data within the at least one provider is authenticated by the provider with a valid signature and that y is computed by evaluating the program on the output values from the at least one provider. The result y and a proof of the correctness of y is transmitted or sent to the verifier for verifying the proof using the public verification key. If the proof verification fails, y is rejected.

Thus, reliable computation of said program can be attested in a simple and secure way.

According to an embodiment of the invention the computing unit can send y to a user or can use y for an application. Such an application can be provided within the computing unit or within another device.

According to a further embodiment the generating of the keys $vk_p$ and $ek_p$ by the verifier and/or the computing and providing of y and $\pi_y$ by the computing unit and/or the verifying of $\pi_y$ by the verifier can be based on a polynomial-time algorithm or polynomial-time algorithms. A set of three polynomial-time algorithms can provide these functions for providing a reliable performance of the method.

Within a further embodiment the number N can be a nonce, i.e. number used once. This nonce is chosen or selected at random.

According to a further embodiment sending of N to the at least one provider can be performed via a communication unit of the computing unit. Thus, the computing unit can comprise a functional entity for providing communication between the verifier and the at least one provider.

According to a further embodiment the proof $\pi_y$ can be randomized in order not to let the verifier learn from the proof anything about the provider information.

According to a further embodiment y and $\pi_y$ can be stored for a later use or verification of y and $\pi_y$. According to a further embodiment y and $\pi_y$ can be sent to a third party for further use of y and $\pi_y$.

According to a further embodiment the verifying of $\pi_y$ can be performed by a trusted module of or within the verifier. This trusted module can act like a firewall with a clear policy on the validity of proofs and may decide and/or effect further activities or non-activities depending on the verification result.

According to a further embodiment and in a general way the computing unit can compute program P on the input along a verifiable cryptographic proof of correct computation. Generating a valid proof for a corrupted program or corrupted inputs requires breaking a cryptographic hard problem, being widely believed to be infeasible.

According to a further embodiment the at least one provider can comprise a sensor for acquiring input data for the program. Alternatively or additionally the at least one provider can comprise another certified data source for providing input into the at least one provider, wherein said input can be transmitted to the computing unit for performing the program.

According to a further embodiment the program can be an application for autonomous driving. Additionally or alternatively the computing unit can be an on-board unit of a vehicle or can be part of such an on-board unit. Such an embodiment refers to the field of autonomous driving of vehicles.

According to a further embodiment the program can be an application for Machine to Machine, M2M, communication or one M2M communication.

Within a further embodiment the method can be applied to a service that requires communication between two nodes via an intermediated node, wherein one node acts as the at least one provider, the other node acts as the verifier and the intermediate node acts as the computing unit. Such an embodiment can be applied, if a communication between the nodes requires a proof of correct functioning of the intermediate node.

According to an embodiment a method can be used for attesting a vehicle's autonomous driving decisions to a party in a vehicular system, e.g. car or junction manager. The method can mitigate any possibility of attacking the autonomous driving unit or intentional modification of the behavior of the vehicle itself.

According to an embodiment a method and system present a method and system for reliable computation of autonomous driving. The approach is generic and useful for many cases where the car has to convince another party of the proper computation of the underlying autonomous driving module, and thus it implicitly proves evidence that its decisions have not been tampered. Please note that in the autonomous driving vehicle the proof of the computation could be both stored for later verification, black box, or on-line verified to lead the vehicle to go back to human control as safety measure.

According to embodiments of the invention it is provided a method for reliable execution and verification of autonomous driving, comprising the steps of
1) Generation of the cryptographic primitives: Generation of the application logic verification circuit/representation.
2) Generate random seed to prevent replay attack.
3) Provider generates signature based on a secret key.
4) Computation of the proof based on the provider inputs, provider signatures and the function circuit/representation.
5) On-line/off-line verification of the proof.

Figure 3:
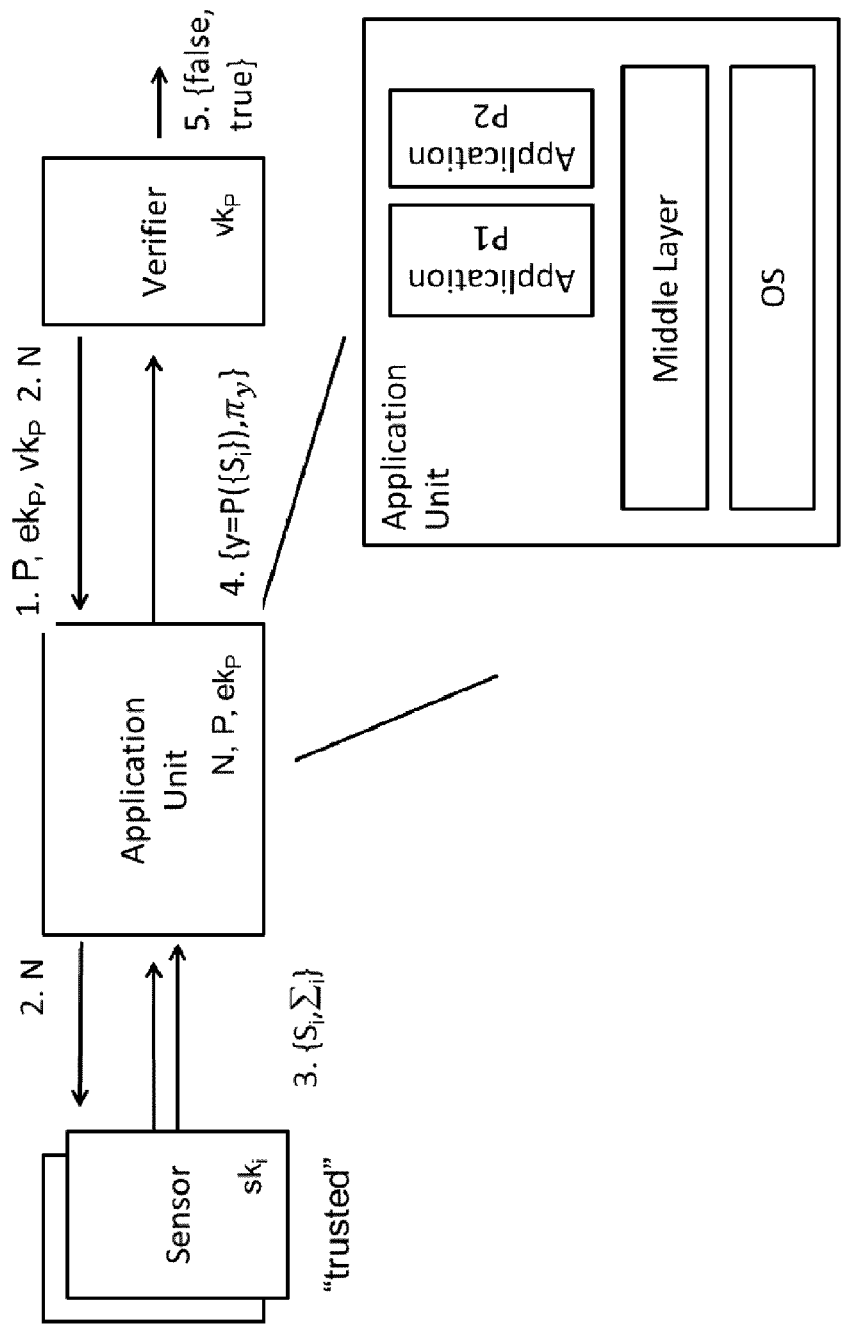
FIG. 3 is showing within a diagram an embodiment of a method and system for reliable computation of a program P according to the invention.

FIG. 3 shows as an embodiment of the invention a model of a vehicle computation platform in a cooperative system where each vehicular on-board unit, dubbed prover, collects information from a set of sensors and then sends the information out via a communication unit to some party, dubbed the verifier. Within this embodiment the at least one provider is realized by two sensors and the computing unit is realized by an application unit. We assume that sensors are tamper proof and have a signature functionality, e.g., RSA-PSS, with the manufacturer's verification key $vk_i$ available to the on-board application unit. Further, we make no assumption on the trustworthiness of the on-board unit. In fact, we assume the unit to be fully controlled by an adversary. Note, this is a very realistic assumption, but designing secure systems within such models has been generally believed to be impossible. See FIG. 3 for the simplified case of two sensors.

An idea of the approach is that the potentially corrupt on-board unit, when asked to compute program P on input S, computes the output of the program P(S) along a proof of correctness "the unit computed P(S)". Our proof system has the property that generating a valid proof for a false statement—e.g. the system computed a corrupted program $y^*=P^*(S_1, \ldots, S_n)$ or used corrupted inputs $y^{**}=P(S_1^*, \ldots, S_n^*)$—requires breaking a cryptographic hard problem, being widely believed to be infeasible.

FIG. 3 shows a system architecture with corrupt on-board unit, where application unit can be considered un-trusted or potentially hacked.

A public verifiable computation scheme VC according to an embodiment of the invention consists of a set of three polynomial-time algorithms (KeyGen,Compute,Verify) defined as follows KeyGen: generates a public verification key vk and public evaluation key ek from a random parameter on the function or program P.

Compute: the deterministic computation algorithm uses the public evaluation key ek and input x. It outputs y=P(x) and a proof $\pi_y$ of y's correctness.

Verify: the deterministic verification algorithm uses the verification key vk, the output y and, the input x and the proof $\pi_y$, and returns 1 if P(x)=y, and 0 otherwise.

The protocol for attesting the correct computation of some program P is as follow, see FIG. 3:
1) Verifier→Unit: generation of the cryptographic primitives, consisting of the public verification key and evaluation key, based on the application or program P.
2) Verifier→Sensor: The verifier chooses a nonce N at random and sends it to the communication unit of the on-board unit, which broadcasts the nonce to the sensors.
3) Sensor→Unit: The sensor(s) produce a sequence of outputs concatenated with the nonce along with a signature over their input signed under secret key $sk_i$. We denote a sensor output and signature pair as $(S_i, \Sigma_i)$. Since sensors are hardware, we assume that the measurement is correct. Clearly, this assumption does not exclude failure of the hardware. However, the complexity of sensor hardware is low in comparison to application units, and practical techniques from reliable computation and hardware manufacturing are known to safeguard an error-less functioning.
4) Unit→Verifier: The application unit receives from the sensors the input sequence $(S_i, \Sigma_i)$ and is asked to compute the crucial program P over the input(s) $S_i$. It computes the result $y=P(S_1, \ldots, S_n)$ over the sensor values along a non-interactive computationally sound cryptographic argument, e.g. SNARG, CS-proof, see Ben-Sasson, Eli, Alessandro Chiesa, Eran Tromer, and Madars Virza. "Succinct non-interactive zero knowledge for a von Neumann architecture." In USENIX Security. 2014, and Brian Parno, Craig Gentry, Jon Howell, and Mariana Raykova. Pinocchio: Nearly practical verifiable computation. In Proceedings of the 34th IEEE Symposium on Security and Privacy, Oakland '13, pages 238-252, 2013, stating that
   a) every sensor value is authenticated by the sensor with a valid signature $\Sigma_i$, and
   b) y is computed by evaluating the program P on the values $S_1, \ldots, S_n$, that is $y=P(S_1, \ldots, S_n)$.

The communication unit sends out the information (y, $\pi_y$) to the verifier. We denote the outcome as (y, $\pi_y$). The proof is randomized in order not to let the verifier learn from the proof anything about the sensor information.

5) Verifier: The verifier, given (y, $\pi_y$) verifies the proof $\pi_y$ using the verification key $vk_P$. It rejects y, if the proof verification fails.

Extension to Archiving: The tuple (y, $\pi_y$) may be archived—like black-boxes in airplanes to analyze the cause after a crash—or sent out to other parties in the vehicle network.

Extension to Online Safety Verifier: The verification over the tuple (y, $\pi_y$) can be implemented by a trusted module within the verifier. This module "acts" like a firewall with a clear policy on the validity of proofs, and may decide to deactivate the car or inform the user over the malfunctioning.

Extension to external Information: Whenever an external input is to be considered it is enough that this is signed in the same way the sensors are. This allows to include input as data coming from certified module connected to the vehicle network.

If within the explained embodiments or within the whole description a sensor is used or cited, this sensor has to be understood as an embodiment of the at least one provider of the general formulation of the invention.

Further Example Applications: Certified Odometer—Digital Tachometer: Digital Tachometer—EC regulation 561/2006—is considered to enforce driving rules on commercial fleet drivers. The tachometer reads the travelled distance—odometer—and the speed—speedometer—of the vehicle and records the max speed and the driving time. The Digital Tachometer records the last 12-months of utilization—daily activities of the driver as driving, break and rest times —, faults, over speeding.

The function to be computed is composed by storing the data received, filtering out the not relevant data and by computing the max speed. The complexity of the function is O(n) where n is the input size to the function since there is a filtering for each input and for each output.

ABS—Anti-lock Braking System: The longitudinal slip ratio is defined as the normalized difference between the circumferential velocity and the translational velocity of the wheel. It is expressed as $$\sigma_x = \begin{cases} \dfrac{\dot\theta_{wy} r_w - \dot x_w}{\dot\theta_{wy} r_w} & \text{(during traction, assuming } \dot\theta_{wy})0) \\ \dfrac{\dot x_w - \dot\theta_{wy} r_w}{\dot x_w} & \text{(during braking, assuming } \dot x_w)0) \end{cases}$$

Figure 4:
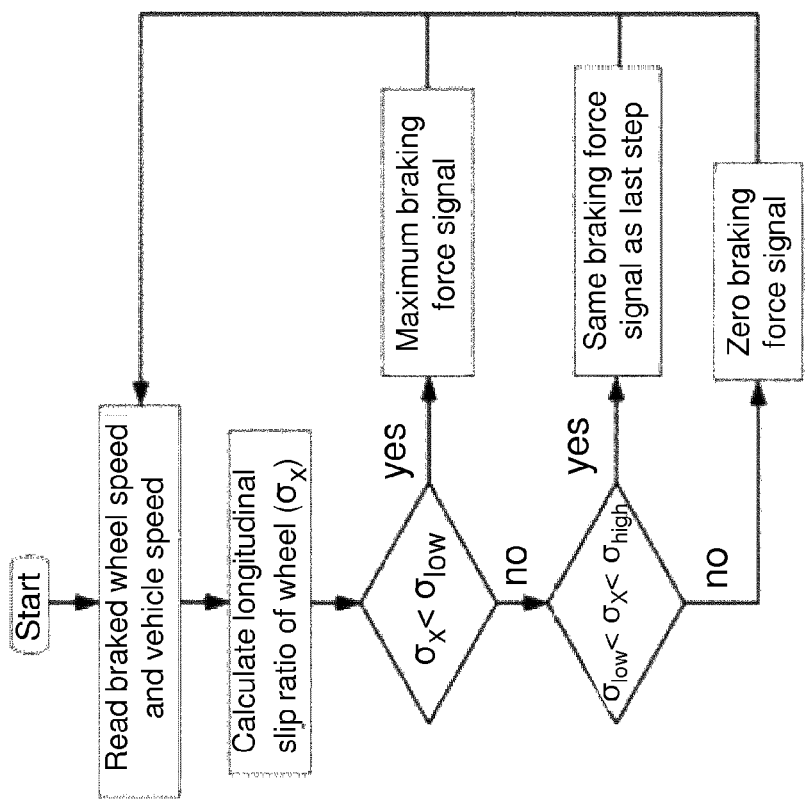
FIG. 4 is showing within a diagram the scheme of an ABS.

FIG. 4 is showing a corresponding scheme of an ABS.

The complexity of the system is to compute two comparisons. The number of gates in this case is O(n), where n is size of the input representation.

Other Examples:

The previous example constitutes a sample of the actual application that could benefit from the verification mechanism, and indeed all driving functions of the vehicle are implementable in this framework, as for example and not limited to Lane Marking detection, Lane keeping, Adaptive cruising and speed control.

In addition, the described method or mechanism can be applied to any kind of service that requires communication between two nodes—one acting as a "Sensor" or "Provider", the other as the "Verifier"—via an intermediate node—the "Application Unit" or "Computing Unit"—, if that communication requires a proof of correct functioning of the intermediate node. Examples include: oneM2M, standard for Machine-to-Machine communication:

In oneM2M the mechanism would support, among others, the following requirements, see TS-0001 "Functional Architecture", TS-0002 "Requirements", TS-0003 "Security Solutions", TR-0008 "Analysis of Security Solutions for the oneM2M System", TR-0012 "oneM2M End-to-End Security and Group Authentication" published at http://onem2m.org/:

| | |
|---|---|
| SER-003 | The oneM2M System shall be able to ensure the integrity of data. |
| SER-007 | When some of the components of an M2M Solution are not available, e.g. WAN connection lost, the oneM2M System shall be able to support the confidentiality and the integrity of data between authorized components of the M2M Solution that are available. |
| SER-013 | The oneM2M System shall be able to provide the mechanism for integrity-checking on boot, periodically on run-time, and on software upgrades for software/hardware/firmware component(s) on M2M Device(s). |

Figure 5:
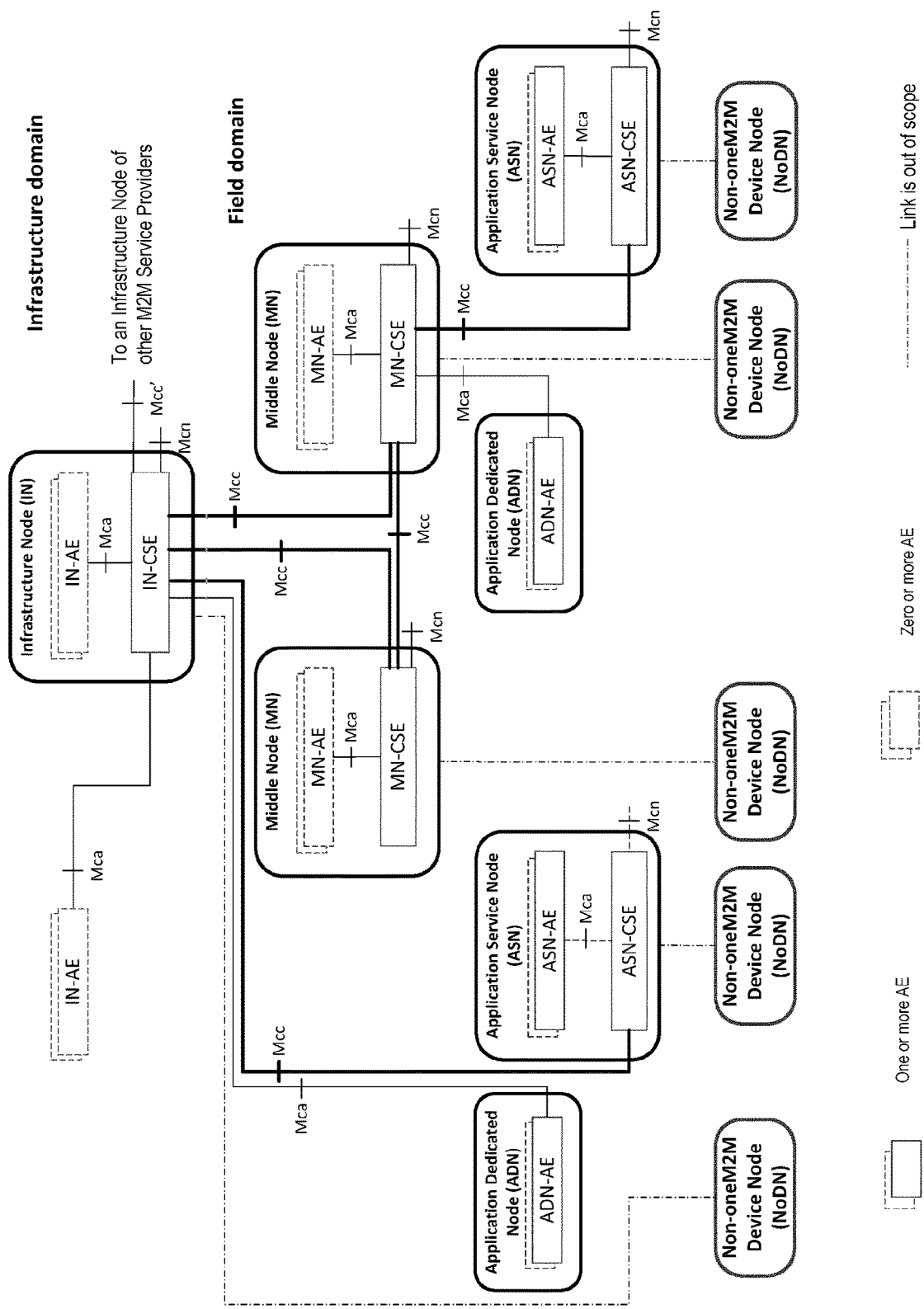
FIG. 5 is showing within a diagram a oneM2M architecture.

Therefore the described mechanism would apply to the nodes of oneM2M and would be supported by Mca and Mcc interfaces, see FIG. 5: Configurations supported by oneM2M Architecture from TS-0001 "Functional Architecture". Note that in oneM2M:

The "Application Unit" would be called "Middle Node", which could reside in an M2M Gateway.

Both, the "Sensor" and the "Verifier", would be an "Application Service Node" or "Application Dedicated Node" which could reside in an M2M Device, or would be an "Infrastructure Node" which could reside in an M2M Service Infrastructure, or would be another "Middle Node".

Embodiments of the invention can show the following features:

1) Limit the trust assumption to the application inputs, the sensor or provider readings or data are signed according to a secret key.
2) The verification of the computation of the main application logic is bind with the verification of the signature of the sensor or provider inputs.
3) The sensors' or providers' inputs do not need to be transmitted to the verifier, they only need to exist during the proving step. This gives very short and efficiently verifiable proofs.
4) Proof statement that combines verification computation and signature verification cryptographic schemes.
5) New application on the TPM, Trusted Platform Module, field, where sensors are trusted and computational unit can be untrusted.

6) Input sensor or provider values are not transmitted or stored in the computation certification proof
7) By randomizing the proof, the verifier of the proof learns nothing about the signed inputs {Si} except for the fact that the output has been computed on valid signatures. Still he may verify the validity of certificate of computation which is also known as proof.

According to embodiments of the invention, methods are presented to thwart attacks against the crucial malfunctioning of the computing unit, application unit or on-board application unit. As a result, parties in a vehicular system or other system relying on the computing or application unit's computation can trust the computation, or in case of misuse take decisions to mitigate damage and casualties.

Little is known about protection mechanisms against the on-board unit. As mentioned in the Introduction, on-board units are special-purpose computing systems. Any known concept to protect computing systems in general thus also carries over to car units. In this field, much emphasis has been put on the concept of Trusted computing.

Trusted computing relies on a cryptographic hardware co-processor. The chip acts as a Trusted Third party and offers some dedicated cryptographic functions as well as tamper resistant storage for key material. One of the TPM's task is to measure the integrity of the boot process, operating system and applications. By comparison to ideal reference values, a third party—verifier—can assess the integrity of the system which is also known as "chain of trust".

There are two problems with the TPM-based approach. An attacker, having physical access to the system, may simply deactivate the TPM. Even in the case of no physical access, the problem of defining the "right" reference values remains. In fact, it is an open problem to define reference values in practice, as operating systems and applications change their configuration continuously, e.g., firmware updates.

Embodiments of the invention secure executions of programs by verification as opposed to trusting the TPM. We minimize the trust assumption on the hardware module by reducing TPMs—in our case providers or sensors—to provide authenticated inputs or data, and compensate the "chain of trust" by a publicly verifiable cryptographic proof. The technical trick in our approach is to prove a statement where one first makes sure that the data origins from a sensor and then computes the desired program. Computing a proof only over the function would allow the attacker to use "fake" data inputs. On the other hand, sending out the data and signatures $(S_i, \Sigma_i)$ along the output $f(S_1, \ldots, S_n)$ would outperform the system in many applications, as it requires from the verifier to recompute $f(S_1, \ldots, S_n)$. In our approach, we can rely on succinct proof systems, e.g. Ben-Sasson, Eli, Alessandro Chiesa, Eran Tromer, and Madars Virza. "Succinct non-interactive zero knowledge for a von Neumann architecture." In USENIX Security. 2014, and make the proofs short and efficiently verifiable. Putting it all together, we build a computing architecture where the computing or on-board unit is corrupt—and we make no provisions to minimize the threat—and the verifier may attest the computing or application units trustworthiness.

The inclusion of the proof makes in fact the difference of our vehicle system or other system. It gives the desired stronger guarantees of a proper and tamper-proof computation of the computing or application unit. The properties of the proof system simply assess that in case of a corrupted computing or application unit, the odds of generating a valid proof—that is, either the corrupted application module or computing unit did not use the measurements from the sensors or providers, or it generated a program P* different from P—are negligibly small.

A main advantage over previous approach is higher flexibility in the configuration of the computing or application unit, both in term of hardware and in term of software. Further prior art regarding verification of information or vehicle systems is known from: Solyom, Stefan, Anders Rantzer, and Jens Lüdemann. "Synthesis of a model-based tire slip controller." Vehicle System Dynamics 41.6 (2004): 475-499, R. G. Longoria, A. Al-Sharif, C. B. Patil, Scaled vehicle system dynamics and control: a case study in antilock braking, Int. J. Vehicle Autonomous Systems 2 (1/2) (2004) 18-39, and K. Li, J. A. Misener, K. Hedrick, On-board road condition monitoring system using slip-based tyre-road friction estimation and wheel speed signal analysis, J. Multi-body Dynamics, IMechE 221 (2007) 129-146.

Embodiments of the present invention are not limited to vehicular systems. In fact, it is applicable to any setting, where one party authenticates data and needs to attest, it has computed a program over the data.

Embodiments of the invention provide a solution, which is a complete change in the approach for safety and security enforcement for autonomous driving, for example.

Within embodiments of the invention the verifier generates or chooses a nonce N—"valid and fresh"—to increase resilience to attack—replay attacks—attempting to reuse sensor readings or inputs. Thus, N can make the signature unique for a specific evaluation of the function P. When verifier is not participating actively in the interaction, nonce N can be generated according to other input, as the absolute time. Program P can then include N into the proof to guarantee signature on a specific time interval.

The proof $\pi_y$ can be a string that the prover or computing unit computed $y=f(x)$ correctly.

When the prover or computing unit sends the response $(\pi_y, y)$ to the verifier, it can sense both the above proof $\pi_y$ and, of course, the computation $y=f(x)$. Here, the response is a pair of two strings. In the context a string can be a sequence of bits.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for verifying reliable computation of a program P, wherein an output of the program P is computed by a computing unit based on input provided by at least one sensor, the method comprising:
generating, by a verifier based on the program P, a public verification key vkp and a public evaluation key ekp;
generating, by the verifier, a random number N;
transmitting, by the verifier, the random number N to the at least one sensor, wherein the at least one sensor is operable to:
produce at least one respective sensor output $S_i$, each respective sensor output $S_i$ comprising a respective sensor value concatenated with the random number N,
produce, for each respective sensor output $S_i$, a respective corresponding signature $\Sigma_i$ over the respective sensor value of the respective sensor output $S_i$, wherein the respective corresponding signature $\Sigma_i$ is signed under a secret key $sk_i$, and
transmit, to the computing unit, an input sequence comprising at least one pair of a respective sensor output and a respective corresponding signature $(S_i, \Sigma_i)$;
receiving, by the verifier from the computing unit:
a program output $y=P(S_i)$ produced by computing, by the computing unit, the program P with the at least one respective sensor output $S_i$, the program output y being based on both the at least one respective sensor value and the random number N, and
a proof $\pi_y$, the proof being computed based on the at least one respective sensor output $S_i$ and the respective corresponding signature $\Sigma_i$ produced for each respective sensor output $S_i$; and
executing, by the verifier, a deterministic verification algorithm that uses the public verification key vkp and the program output y to verify the correctness of the proof $\pi_y$; and
accepting the program output y if the correctness of the proof is verified or otherwise rejecting the program output if the proof verification fails.

2. The method according to claim 1, wherein the computing unit sends y to a user or uses y for an application.

3. The method according to claim 1, wherein the generating the public verification key vkp and the public evaluation key ekp by the verifier and/or the computing and providing of y and the proof πy by the computing unit and/or the verifying of the proof πy by the verifier is or are based on a polynomial-time algorithm or polynomial-time algorithms.

4. The method according to claim 1, wherein the random number N is a nonce.

5. The method according to claim 1, wherein the proof $\pi_y$ is randomized.

6. The method according to claim 1, wherein y and the proof $\pi_y$ are stored.

7. The method according to claim 1, wherein y and the proof $\pi_y$ are sent to a third party.

8. The method according to claim 1, wherein the executing, by the verifier, the deterministic verification algorithm that uses the public verification key vkp and the program output y to verify the correctness of the proof $\pi_y$ is performed by a trusted module of the verifier.

9. The method according to claim 1, wherein each respective sensor value of each respective sensor output $S_i$ is a measurement captured by the at least one sensor.

10. The method according to claim 1, wherein the program is an application for autonomous driving, and
wherein the computing unit is an on-board unit of a vehicle or is part of such an on-board unit.

11. The method according to claim 1, wherein the program is an application for Machine to Machine (M2M) communication or oneM2M communication.

12. A system for verifying reliable computation of a program P, the system comprising one or more processors coupled to a non-transitory storage medium or media containing instructions, which when executed by the one or more processors, alone or in combination, cause the system to perform a method comprising:
generating, by the system based on the program P, a public verification key vkp and a public evaluation key ekp;
generating, by the system, a random number N;
transmitting, by the system, the random number N to at least one sensor, wherein the at least one sensor is operable to:
produce at least one respective sensor output $S_i$, each respective sensor output $S_i$ comprising a respective sensor value concatenated with the random number N,
produce, for each respective sensor output $S_i$, a respective corresponding signature $\Sigma_i$ over the respective sensor value of the respective sensor output $S_i$, wherein the respective corresponding signature $\Sigma_i$ is signed under a secret key $sk_i$, and
transmit, to a computing unit, an input sequence comprising at least one pair of a respective sensor output and a respective corresponding signature $(S_i, \Sigma_i)$;
receiving, by a verifier from the computing unit:
a program output $y=P(S_i)$ produced by computing, by the computing unit, the program P with the at least one respective sensor output $S_i$, the program output y being based on both the at least one respective sensor value and the random number N, and
a proof $\pi_y$, the proof being computed based on the at least one respective sensor output $S_i$ and the respective corresponding signature $\Sigma_i$ produced for each respective sensor output $S_i$; and
executing, by the system, a deterministic verification algorithm that uses the public verification key vkp and the program output y to verify the correctness of the proof $\pi_y$; and
accepting the program output y if the correctness of the proof is verified or otherwise rejecting the program output if the proof verification fails.

13. A tangible, non-transitory computer-readable medium having instructions thereon which, upon being executed by one or more processors, alone or in combination, provide for execution of the method according to claim 1.

14. The method according to claim 1, wherein verifying the correctness of the proof $\pi_y$ demonstrates that each respective signature $\Sigma_i$ was computed based on both of a respective sensor value and the number N.

15. A method for verifying reliable computation of a program P configured to carry out an autonomous driving function, wherein an output of the program P is computed by a computing unit based on input provided by at least one sensor, the method comprising:
generating, by a verifier based on the program P, a public verification key vkp and a public evaluation key ekp;
generating, by the verifier, a random number N;
transmitting, by the verifier, the random number N to the computing unit for being broadcast, by the computing unit, to the at least one sensor, wherein the at least one sensor is operable to:

produce at least one respective sensor output $S_i$, each respective sensor output $S_i$ comprising a respective sensor value concatenated with the random number N, produce, for each respective sensor output $S_i$, a respective corresponding signature $\Sigma_i$ over the respective sensor value of the respective sensor output $S_i$, wherein the respective corresponding signature $\Sigma_i$ is signed under a secret key $sk_i$, and transmit, to the computing unit, an input sequence comprising at least one pair of a respective sensor output and a respective corresponding signature $(S_i, \Sigma_i)$;

receiving, by the verifier from the computing unit:

a program output $y=P(S_i)$ produced by computing, by the computing unit, the program P with the at least one respective sensor output $S_i$, the program output y being based on both the at least one respective sensor value and the random number N, and a proof $\pi_y$, the proof being computed based on the at least one respective sensor output $S_i$ and the respective corresponding signature $\Sigma_i$ produced for each respective sensor output $S_i$; and executing, by the verifier, a deterministic verification algorithm that uses the public verification key vkp and the program output y to verify the correctness of the proof $\pi_y$; and carrying out the autonomous driving function based on the program output y if the correctness of the proof is verified, or otherwise rejecting the program output if the proof verification fails.

16. The method according to claim 15, further comprising, if the proof verification fails, deactivating the autonomous driving function.

17. The method according to claim 15, wherein the autonomous driving function is one of lane marking detection, lane keeping, adaptive cruise control, speed control, and anti-lock braking.

\* \* \* \* \*